(12) United States Patent
Yap

(10) Patent No.: US 10,138,059 B2
(45) Date of Patent: Nov. 27, 2018

(54) INTEGRATED SUPPLY CHAIN BUILDING

(71) Applicant: Chin Kok Yap, Singapore (SG)

(72) Inventor: Chin Kok Yap, Singapore (SG)

(*) Notice: Subject to any disclaimer, the term of this patent is extended or adjusted under 35 U.S.C. 154(b) by 155 days.

(21) Appl. No.: 14/649,878

(22) PCT Filed: Dec. 5, 2013

(86) PCT No.: PCT/IB2013/060664
§ 371 (c)(1),
(2) Date: Jun. 4, 2015

(87) PCT Pub. No.: WO2014/087365
PCT Pub. Date: Jun. 12, 2014

(65) Prior Publication Data
US 2015/0314960 A1    Nov. 5, 2015

(30) Foreign Application Priority Data
Dec. 6, 2012 (WO) .................. PCT/IB2012/057012

(51) Int. Cl.
*B65G 1/04* (2006.01)
*B65G 1/06* (2006.01)
(Continued)

(52) U.S. Cl.
CPC ........... *B65G 1/0414* (2013.01); *B65G 1/065* (2013.01); *B65G 1/137* (2013.01); *B65G 47/901* (2013.01);
(Continued)

(58) Field of Classification Search
CPC ........ E04H 5/02; B65G 1/0492; B65G 65/08; B65G 2814/03
(Continued)

(56) References Cited

U.S. PATENT DOCUMENTS 3,677,421 A * 7/1972 Kintner ................ B65G 1/0421
                                              414/275
6,321,138 B1 * 11/2001 Livesay ............... B65G 1/0414
                                              198/346.1
(Continued)

FOREIGN PATENT DOCUMENTS

| CN | 2700513 A1 * | 10/2012 | ................ B60S 5/06 |
|---|---|---|---|
| FR | 2730715 | 8/1996 | |

(Continued)

OTHER PUBLICATIONS

Allstate Business Centers website screen capture.*
(Continued)

*Primary Examiner* — Ronald P Jarrett
(74) *Attorney, Agent, or Firm* — Taylor English Duma LLP

(57) ABSTRACT

The application provides a multi-storey warehouse. The warehouse includes a warehouse building, a plurality of floor levels, an inclined ramp arrangement, one or more automated storage and retrieval systems, and a handling device. The floor levels and the automated storage and retrieval system are located within the warehouse building. The inclined ramp arrangement connects the floor levels with a ground level. The automated storage and retrieval system comprises two adjacent rows of multi-storey pallet racks which are separated by an aisle. A first end of the automated storage and retrieval system is provided adjacent to a lateral side of the floor levels. The handling device is located in the area of the aisle, wherein the handling device serves a plurality of pick/place locations which are provided at the floor levels as well as a plurality of storage locations which are provided in the multi-storey pallet racks.

20 Claims, 13 Drawing Sheets

Figure 1:
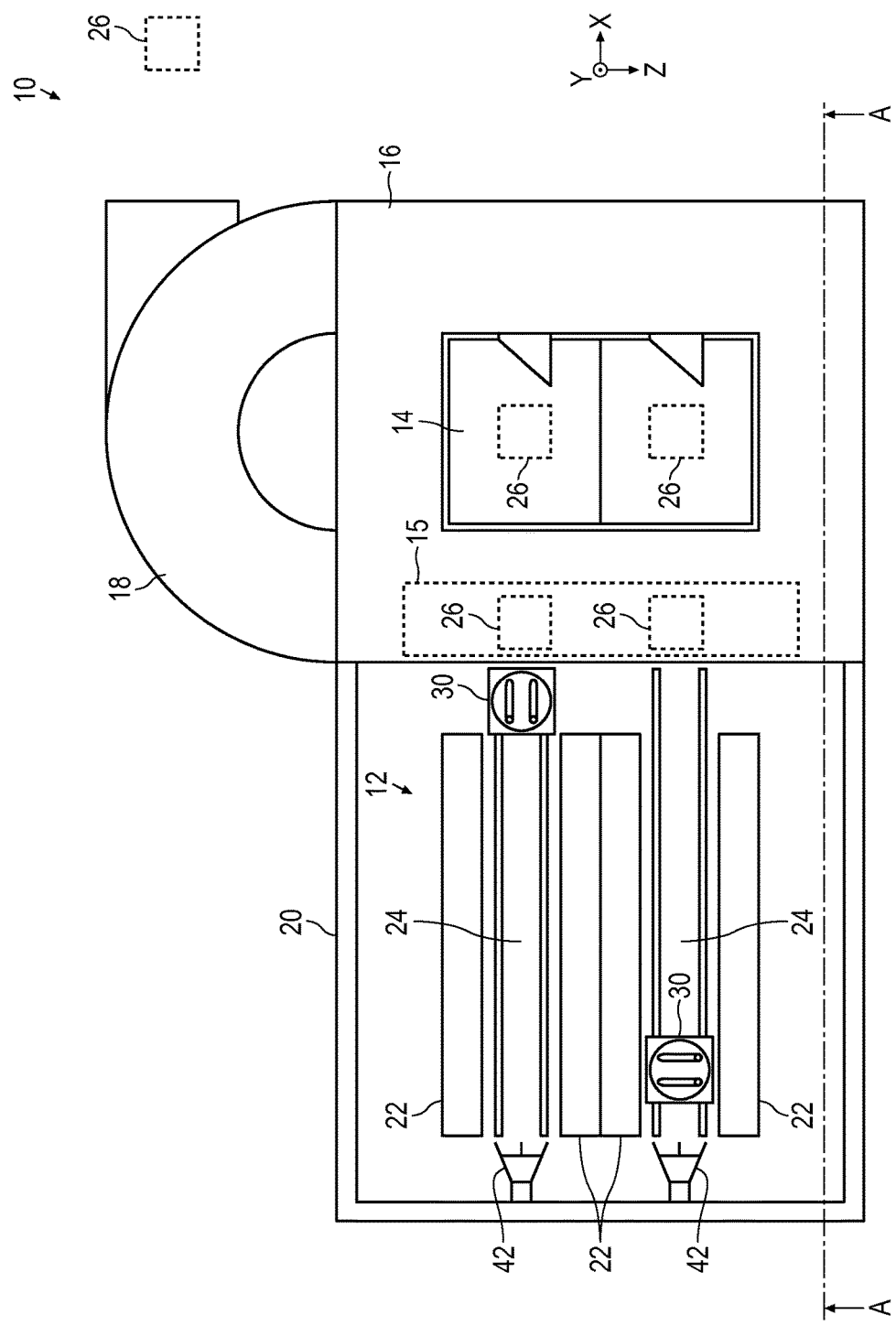

(51) Int. Cl.
*B65G 1/137* (2006.01)
*B65G 47/90* (2006.01)
*B65G 65/08* (2006.01)
*E04H 5/02* (2006.01)

(52) U.S. Cl.
CPC .......... *B65G 47/905* (2013.01); *B65G 65/08* (2013.01); *E04H 5/02* (2013.01); *B65G 2201/0267* (2013.01); *B65G 2203/0283* (2013.01); *B65G 2814/03* (2013.01)

(58) Field of Classification Search
USPC .... 414/222.07, 227, 234, 260, 281; 700/245
See application file for complete search history.

(56) References Cited

U.S. PATENT DOCUMENTS

| | | | |
|---|---|---|---|
| 9,650,022 B2* | 5/2017 | Yang | B60S 5/06 |
| 2005/0081457 A1* | 4/2005 | Moreo | B66B 19/00 |
| | | | 52/29 |
| 2007/0031218 A1 | 2/2007 | Hagg | |
| 2007/0276535 A1 | 11/2007 | Haag | |
| 2010/0007496 A1* | 1/2010 | Orlassino | H04W 4/02 |
| | | | 340/572.1 |
| 2010/0076591 A1* | 3/2010 | Lert, Jr. | B65G 1/0492 |
| | | | 700/216 |
| 2011/0106295 A1* | 5/2011 | Miranda | B65G 1/1378 |
| | | | 700/216 |
| 2012/0282068 A1 | 11/2012 | Tschurwald et al. | |
| 2014/0002242 A1* | 1/2014 | Fenkanyn | H01Q 1/2216 |
| | | | 340/10.1 |

FOREIGN PATENT DOCUMENTS

| | | |
|---|---|---|
| JP | H10-17111 | 1/1998 |
| JP | H10218375 | 8/1998 |
| JP | 2002274603 | 9/2002 |
| JP | 2009220952 | 10/2009 |
| JP | 2011178549 | 9/2011 |
| JP | 4964438 | 6/2012 |

OTHER PUBLICATIONS

Yap, Chin Kok; International Search Report for PCT/IB2013/060664, filed Dec. 5, 2013, dated Apr. 1, 2014, 4 pgs.

Building and Construction Authority; Article entitled: "Best Buildable Design Awards 2001", retrieved from <https://www.bca.gov.sg/Awards/BestbuildableDesign/bda00_08.htm>, retrieved on Oct. 28, 2016, 2 pgs.

Hatlevik, Kurt; "Types of Warehouses", retrieved from <https://kurthatlevik.wordpress.com/2011/02/25/types-of-warehouses/>, retrieved on Oct. 28, 2016, 14 pgs.

Yap, Chin Kok; Extended European Search Report for serial No. 13859800.8, filed Jun. 5, 2015, dated Nov. 7, 2016, 28 pgs.

Yap, Chin Kok; Japanese Office Action for serial No. 2015-546138, filed Dec. 5, 2013, dated Oct. 18, 2016, 9 pgs.

Yap, Chin Kok; Office Action for Korean patent application No. 10-2015-7014759, dated Aug. 3, 2017, 15 pgs.

* cited by examiner

INTEGRATED SUPPLY CHAIN BUILDING

This application relates to a multi-storey warehouse with an automated warehouses and automated storage and retrieval system (ASRS) and to a method for operating the multi-storey warehouse.

Warehouses with automated storage and retrieval systems (ASRS) require fewer workers to operate. Various implementations of the ASRS are possible. In one implementation, the ASRS includes a mechanized material handling automation system that is provided for continuous product flow. The system handles loads, which are assigned a dynamic path, rather than a location, within a system.

US2007/0031218 discloses a system and method for automated storage and retrieval that employs a two-dimensional, vertically oriented storage with storage areas, a lift, and a vehicle transfer area. The storage areas are arranged in a grid along a horizontal axis. The lift is provided for access to one or more floors of the storage areas. The vehicle transfer area allows transfer of vehicles between an exterior transit way and the lift. Unique identification data is assigned to each vehicle upon access to the vehicle transfer area. Time data corresponding to the identification data is then acquired.

The automated warehouses often have advantages of reduced operating costs, better protection against pilferage, as well as less damage to goods stored in these warehouses It is an object of this application to provide an improved warehouse.

It is believed that the warehouses can be improved by stacking its pallet load work sites in order to save land space.

The application provides an automated multi-storey warehouse.

The warehouse is used for storing loads that are placed on pallets. The loads refer to material, which can be placed on vehicles for conveyance. The pallets refer to frames, which can be produced using wood or metal. The wooden pallets are often used for supporting light loads while the metal pallets are often used for supporting heavy loads. As an example, the metal pallets can be used for supporting loads with maximum weight of about 1500 kilograms. The pallets are often sized for easy entry into doors and passageways of factories. The pallets also often comply with ISO (International Organization for Standardization) standards.

The multi-storey warehouse includes a warehouse building, a plurality of different floor levels, an inclined vehicle ramp arrangement, one or more Automated Storage and Retrieval Systems (ASRS), and at least one moveable handling device.

In particular, the warehouse building encloses the different floor levels as well as the ASRS. The floor levels are stacked one on top of another and are aligned essentially in a vertical manner. Each floor level includes at least one pallet load pick/place location.

The vehicle ramp arrangement connects the floor levels with the ground level of the warehouse building. The said arrangement refers to several inclined vehicle slopes, which are connected to each other. The vehicle refers to a means of transporting goods that include pallet loads. The several vehicle slopes are connected to each other. These vehicle slopes are often arranged in a spiral manner.

The ASRS includes at two adjacent rows of multi-storey pallet racks, wherein the two rows are separated by an essentially straight aisle. Each pallet rack has multiple horizontal storage levels or storeys while each storey has multiple pallet load storage locations. The pallet racks and the aisle are arranged essentially along a straight line. A first end of the automated storage and retrieval system is provided adjacent to a lateral side of the plurality of floor levels.

Each handling device is located in the area of the aisle. Each aisle has one handling device although it can also have two or more handling devices.

The handling device comprises a floor rail supporting a lower cart and comprises a top rail, which is positioned above the multi-storey pallet racks, wherein the top rail supports an upper cart. The floor rail is placed on the floor of the aisle and it extends along the longitudinal axis of the aisle. The top rail is placed directly above the floor rail. In other words, the top rail and the floor rail are positioned essentially in the same vertical plane.

The handling device also includes at least one vertical beam and a pallet load pick/place unit. The vertical extends between the upper cart and the lower cart and also connects the upper cart to the lower cart.

In use, the storage locations act to store pallet loads. The pick/place location serves to store pallet loads, which are intended for transferring to the storage locations and to store pallet loads, which are transferred from the storage locations.

The ramp arrangement allows a pallet load transport vehicle, such as a lorry, to transport pallet loads from a shipping location to one of the floor levels. The shipping location is positioned outside the warehouse building. The ramp arrangement enables the vehicle to travel from the ground level of the warehouse building to any floor level of the building. The ramp also enables the vehicle to transport the pallet loads, which are located at the different floor levels to a shipping location outside warehouse building.

The handling device acts to transport the pallet loads from the different pick/place locations of the respective floor levels to the storage locations in the multi-storey pallet racks. The handling device also serves to transport the pallet loads from these storage locations to the load pick/place locations.

The pallet load pick/place unit is intended for lifting the pallet loads and for moving the pallet loads. The pallet load pick/place unit often has fork arms that moving horizontally to lift and carry the pallet loads. In a general sense, the fork arms may move horizontally at a right angle to the longitudinal direction of aisle. The fork arms may also rotate about a vertical axis of the vertical beam.

The pallet load pick/place unit is moveable vertically in the longitudinal direction of the vertical beam while the upper cart and the lower cart enable the vertical beam moves horizontally along the longitudinal axis of the aisle.

The floor rail and the top rail allow the upper cart and the lower cart respectively to move horizontally along the longitudinal axis of the aisle.

The placement of the top rail and the floor rail allows the vertical beam to extend from the top to the bottom of the pallet racks. This in turn enables the pallet load pick/place unit to travel from the top of the pallet racks to the bottom of the pallet racks. In other words, one pallet load pick/place unit can handle all storage locations in the pallet racks.

Furthermore, the connection of vertical beam to the upper cart and the lower cart makes the pallet load pick/place unit stable such that it is able to handle even heavy pallet loads.

This warehouse has a benefit of occupying less space since the loading and unloading of the pallet loads occur at different floor levels instead of just one floor level. To provide the same pallet load transfer capacity, this warehouse with multi-floor levels for pallet load transfer would therefore take up less space. This is especially important in areas where land is scarce.

In a general sense, in addition to storing the pallet loads, the warehouse can also store bins, reels, and cartons. The bins refer to containers for storing items while the cartons refer to boxes, which can be made of cardboard or plastic, for containing food or drinks. The reels refer to something that is turned around an object, which is often cylindrical in shape. The maximum weight of the bins, reels, or cartons is usually less than the maximum weight of the pallet loads.

The warehouse can also have more than one vehicle ramp arrangements. One vehicle ramp arrangement can be used to transport pallet loads into the warehouse while another vehicle ramp arrangement can be used to transport pallet loads out of the warehouse.

The pick/place locations are often aligned essentially vertically. This arrangement allows for easy placement of the pallet loads by the handling device.

The plurality of floor levels often includes a plurality of work-site enclosures. The work-site enclosures allow easy processing of the pallet loads. The processing includes repacking of the pallet loads as well as treatment, such as repair, of the items of the pallet loads.

A second end of the automated storage and retrieval system can be positioned adjacent to a side of the warehouse building, wherein the side of the warehouse building comprises at least one elongated vertical opening. The vertical opening extends essentially along the width of the aisle.

The opening allows a supervisor outside the building to observe and to obtain visual information of the operation inside the warehouse, which can be related to the handling device or to transfer of the pallet loads. The supervisor is then able to response accordingly and quickly. For example, when pallet load handling capacity at one floor level is fully utilized, the supervisor can direct incoming pallet loads to other floor levels where their pallet load handling capacities are not fully used.

The vertical opening often comprises a transparent weather cover for protection against weather.

An office building can be provided in the vicinity of the side of the warehouse building. The office building has rooms with transparent windows that are facing the side of the warehouse building for observing the operations of the warehouse. The workers in the office building can then view the inside of the warehouse for providing guiding information to operators in the warehouse.

A second end of the automated storage and retrieval system can include at least one electronic surveillance system. The electronic surveillance system includes a camera that is directed to the first end of the ASRS. The camera then captures images of the ASRS for providing visual information of the operation of the ASRS.

The multi-storey warehouse can include a plurality of Radio Frequency Identification (RFID) readers for reading a RFID tag of a cargo vehicle. In particular, the RFID readers can read a RFID tag of a badge of a driver of the cargo vehicle.

The RFID tag has a unique identifier data, wherein the RFID tag sends the identifier data to the RFID reader when the RFID reader interrogates the RFID tag. The interrogation refers to sending of a pre-determined electromagnetic wave signal from the RFID reader to the RFID tag.

The RFID reader can be placed at a vehicle entrance to the warehouse building, at pre-determined locations of the vehicle ramp arrangement, and at entrances to the floor levels for detecting a presence of the RFID tag at these locations.

The application also provides a method for delivering a pallet load to a storage location within a multi-storey warehouse.

The storage location is provided in two adjacent rows of essentially straight multi-storey pallet racks. The two pallet racks are separated by an essentially straight aisle.

The method includes a step of providing the pallet load to a shipping location, which is located outside the multi-storey warehouse. A vehicle is used for transporting the pallet load from the shipping location to one of a plurality of floor levels of the multi-storey warehouse. The vehicle is later used for transporting the pallet load to a pick/place location which is provided at the same floor level. After this, a handling device is used for transporting the pallet load from the pick/place location to the storage location, which is provided in one storey of the two multi-storey pallet racks.

The application also provides a method for handling a pallet load for a storage location within a multi-storey warehouse. The storage location is provided within two adjacent rows of essentially straight multi-storey pallet racks which are separated by an essentially straight aisle.

The method includes a step of storing the pallet load to the storage location. The step of storing includes a step of providing the pallet load to a shipping location, which is positioned outside the multi-storey warehouse. A vehicle is afterward used for transporting the pallet load from the shipping location to the ground level outside the multi-storey warehouse, to one of a plurality of floor levels of the multi-storey warehouse, and to a pick/place location which is provided at the same floor level. A handling device, which is located in the area of the aisle, is later used for transporting the pallet load from the pick/place location to the storage location.

The method also includes a step of retrieving the pallet load from the storage location. The step of retrieving includes using the handling device for transporting the pallet load from the storage location to a pick/place location which is provided at one of the plurality of the floor levels. Each floor level is provided with at least one pick/place location while one pick/place location of one of the floor levels is selected to receive the pallet load. After this, the vehicle is used for transporting the pallet load from the pick/place location to the ground level of the warehouse and to a shipping location that is positioned outside the warehouse.

The step of the retrieving of the pallet load can include a step of using the vehicle for transporting the pallet load from the pick/place location to a repacking location on the same floor level. The pallet load is repacked according to the need of the customer.

The repacking of the pallet load can include removing items from the pallet load. The repacking of the pallet load can also include adding items to the pallet load. In a general sense, the repacking of the pallet load can include the removing and the adding of items to the pallet load.

Different vehicles can be used for the transporting the pallet load. A first vehicle, such as a lorry, can be is used for transporting the pallet load from the shipping location to one of the plurality of floor levels of the multi-storey warehouse while a second vehicle, such as fork lift, is then used for transporting the pallet load from the first vehicle at the said floor level to the pick/place location that is positioned at the same floor level.

The application provides a method to manage the above warehouse. The method provides a way of operating of the warehouse. The method includes a step of allocating a plurality of storage locations of multi-storey pallet racks to a customer. The method also includes a step of allocating at least one work site enclosure to the customer. The work site enclosure provides a place for processing pallet loads of the customer. The processing may include repacking of the pallet loads. The pallet loads are then handled or moved between the plurality of storage locations and the at least one work site enclosure.

The number of storage locations which are allocated to the customer can be altered according to a storage location request message of the customer. The altering can increase or decrease the number of allocated storage locations. This altering allows the customer to respond to changing market conditions.

Similarly, the number of work site enclosures which are allocated to the customer can be also altered according to a work site enclosure request message of the customer.

The application also provides a method to manage the above warehouse. The method includes a step of obtaining visual information of a handling of pallet loads. A predetermined message that corresponds to the visual information is then selected. The predetermined message is later sent to an operator of the warehouse building for activating actions corresponding to the visual information.

For example, a supervisor may observe that a handling device is working too slowly. The supervisor may then send a message to a technician requesting for checking the handling device.

Different means of obtaining the visual information are possible. The obtaining visual information can be provided from outside of the warehouse building through a vertical opening of a side a warehouse building. The obtaining visual information can also be provided by an electronic surveillance system with a camera that is directed towards the automated storage and retrieval system.

Figure 2:
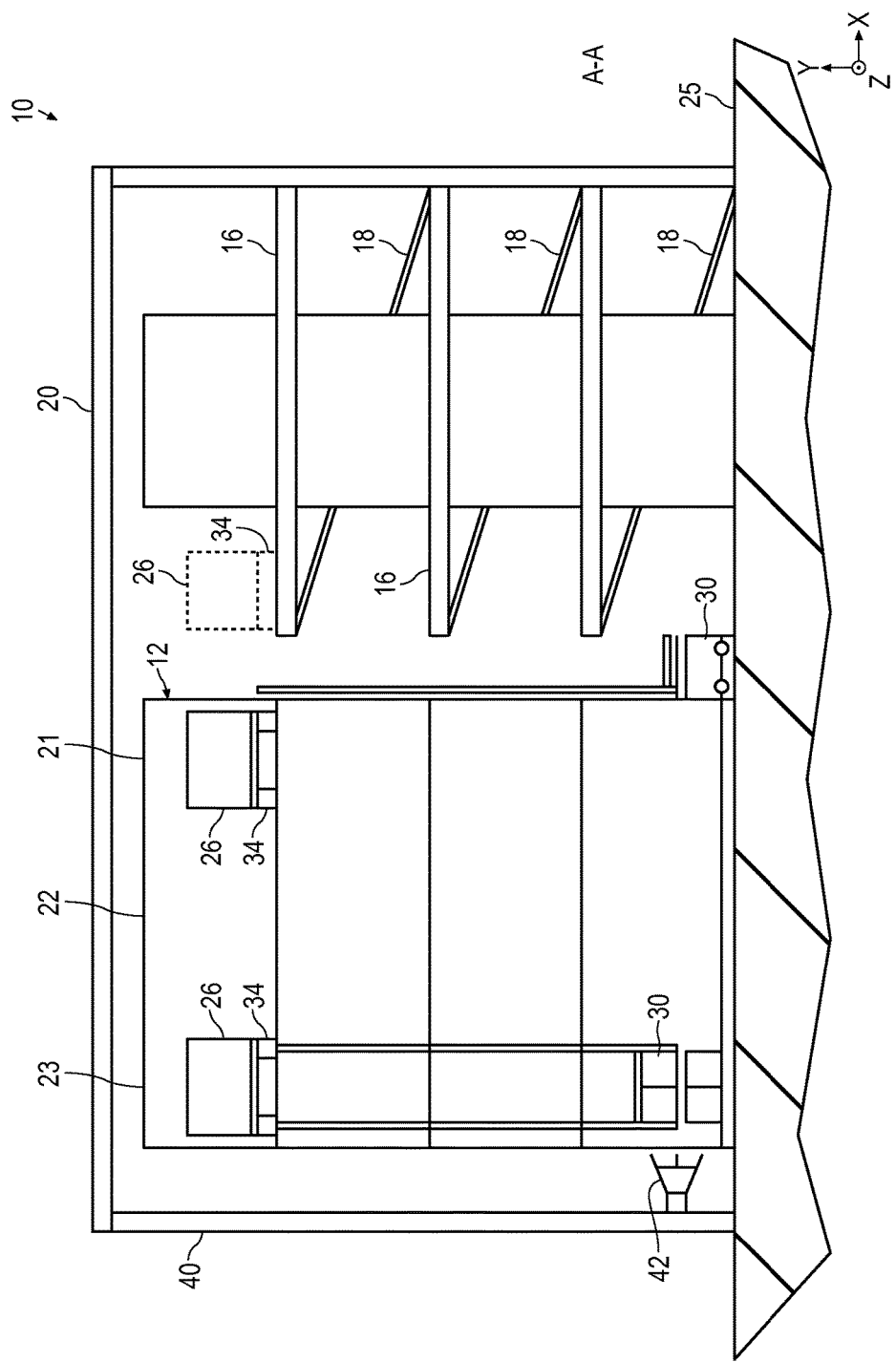
Figure 3:
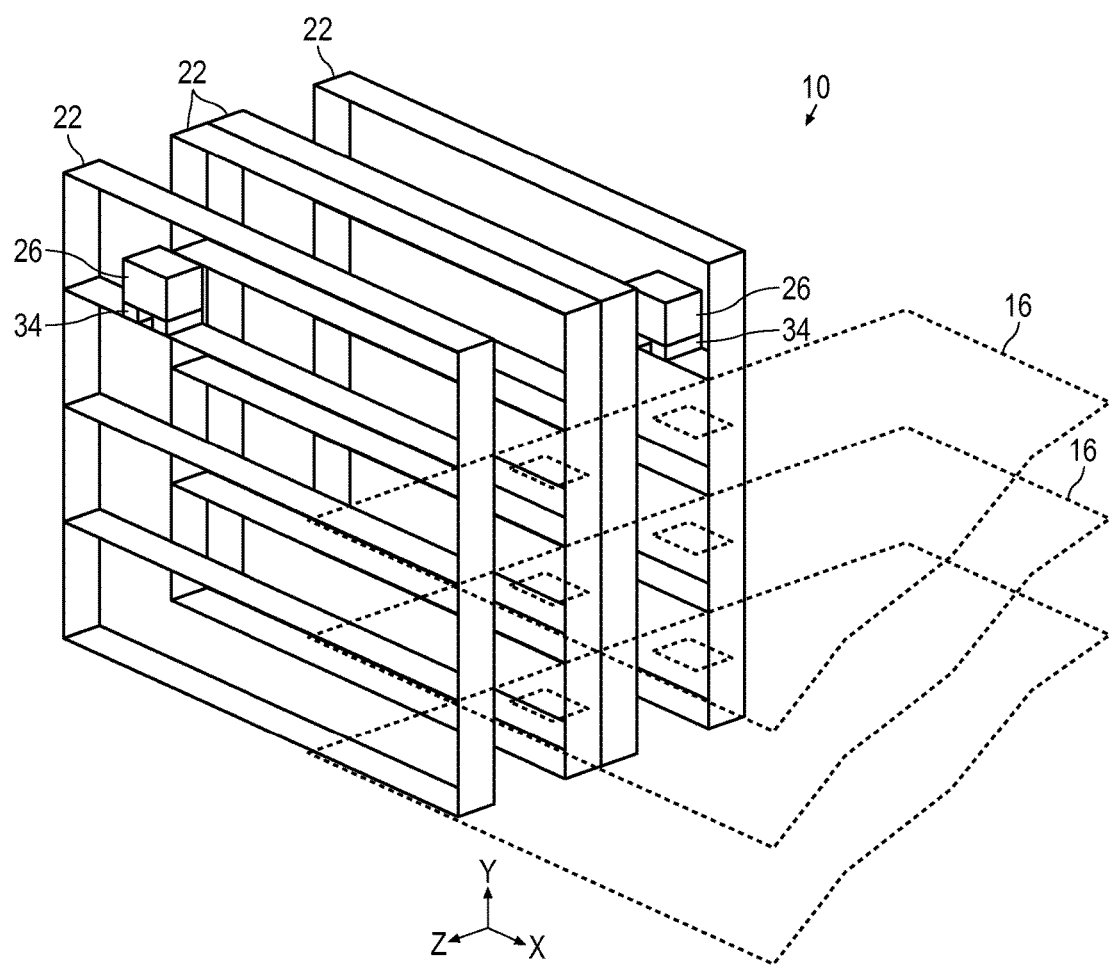
Figure 4:
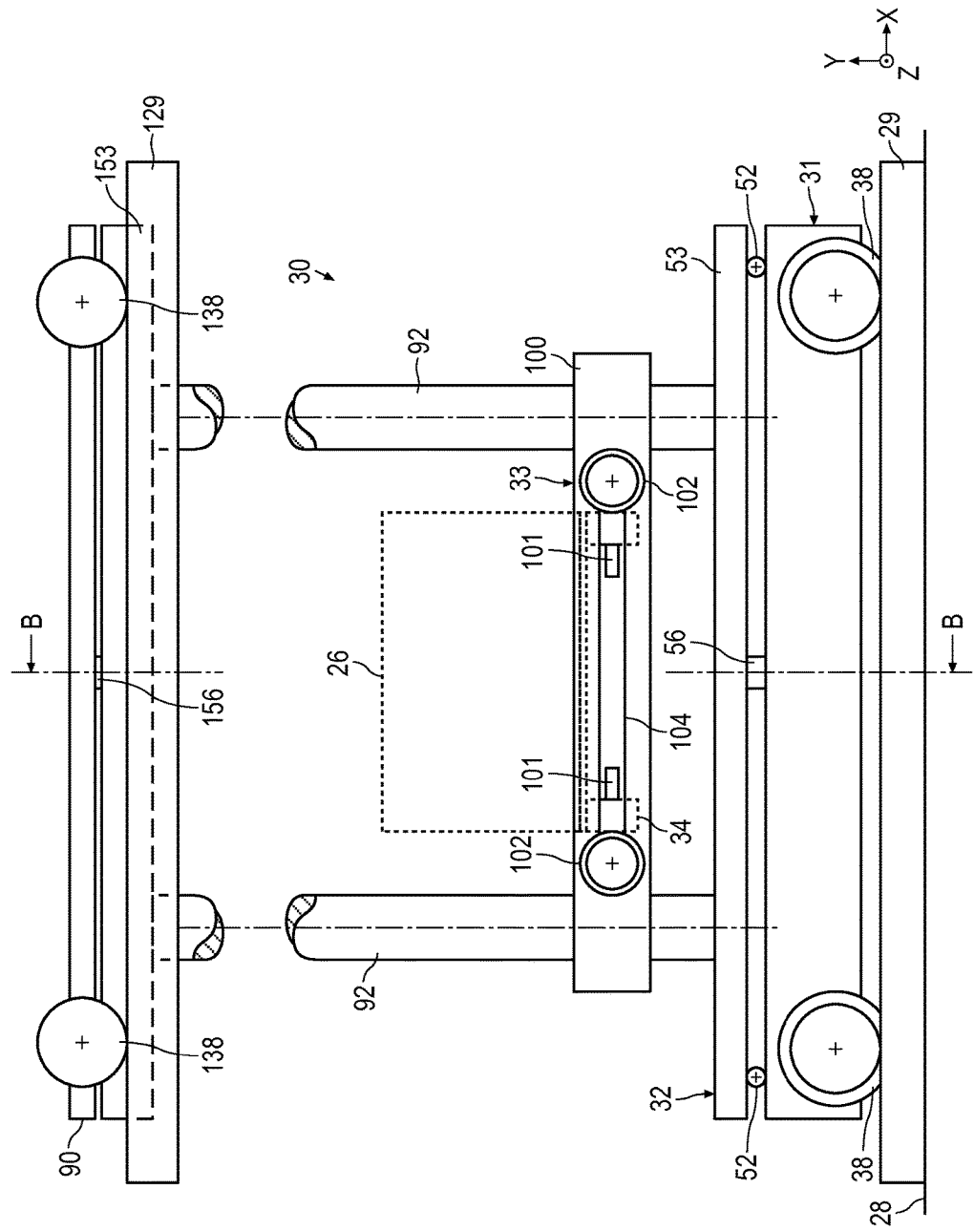
Figure 5:
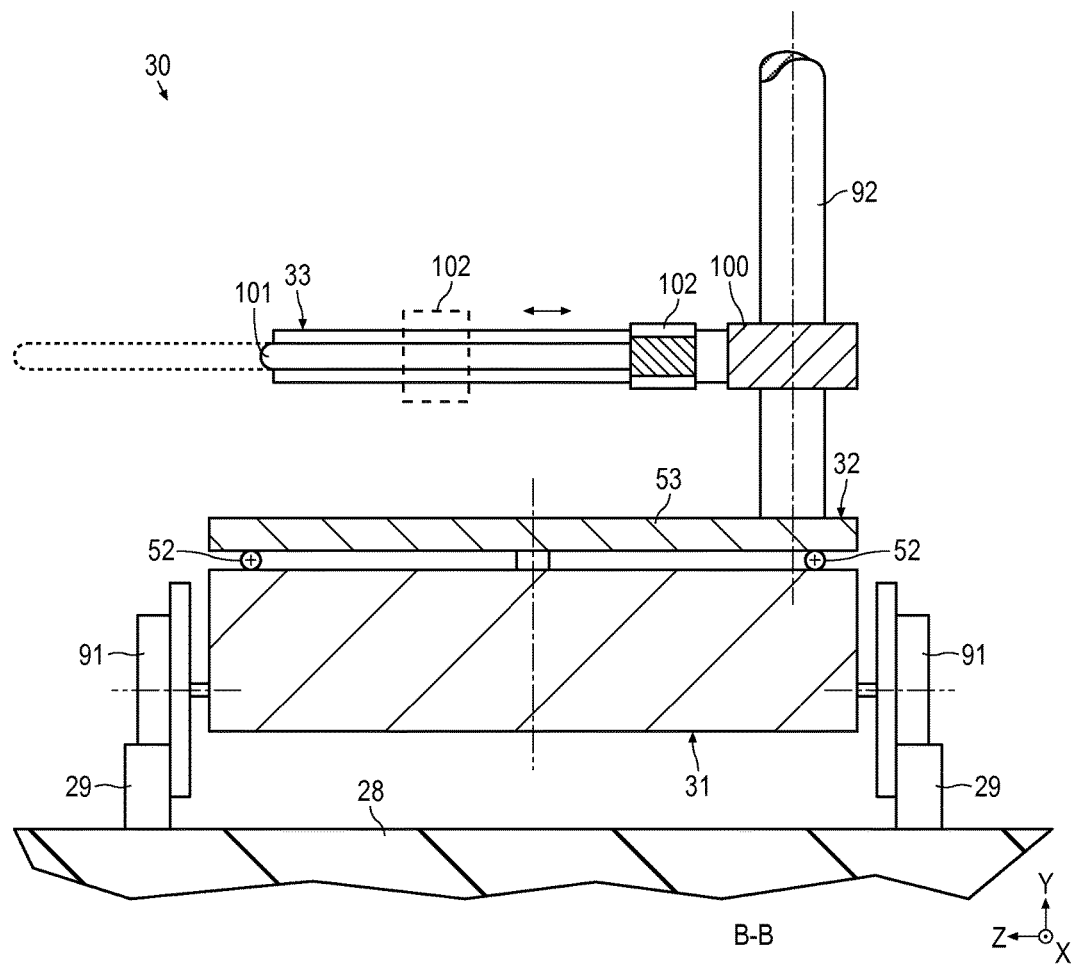
Figure 6:
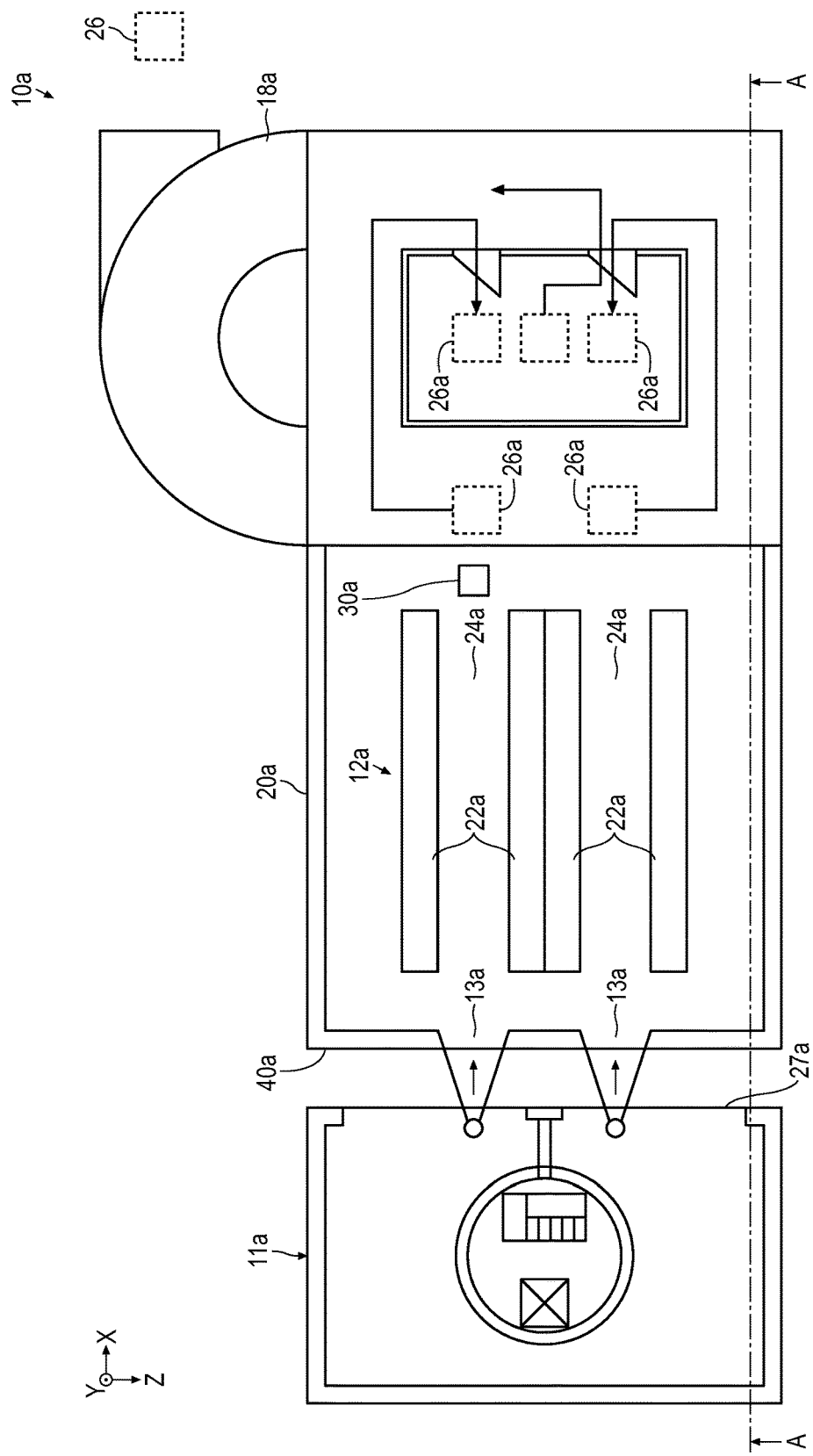
Figure 7:
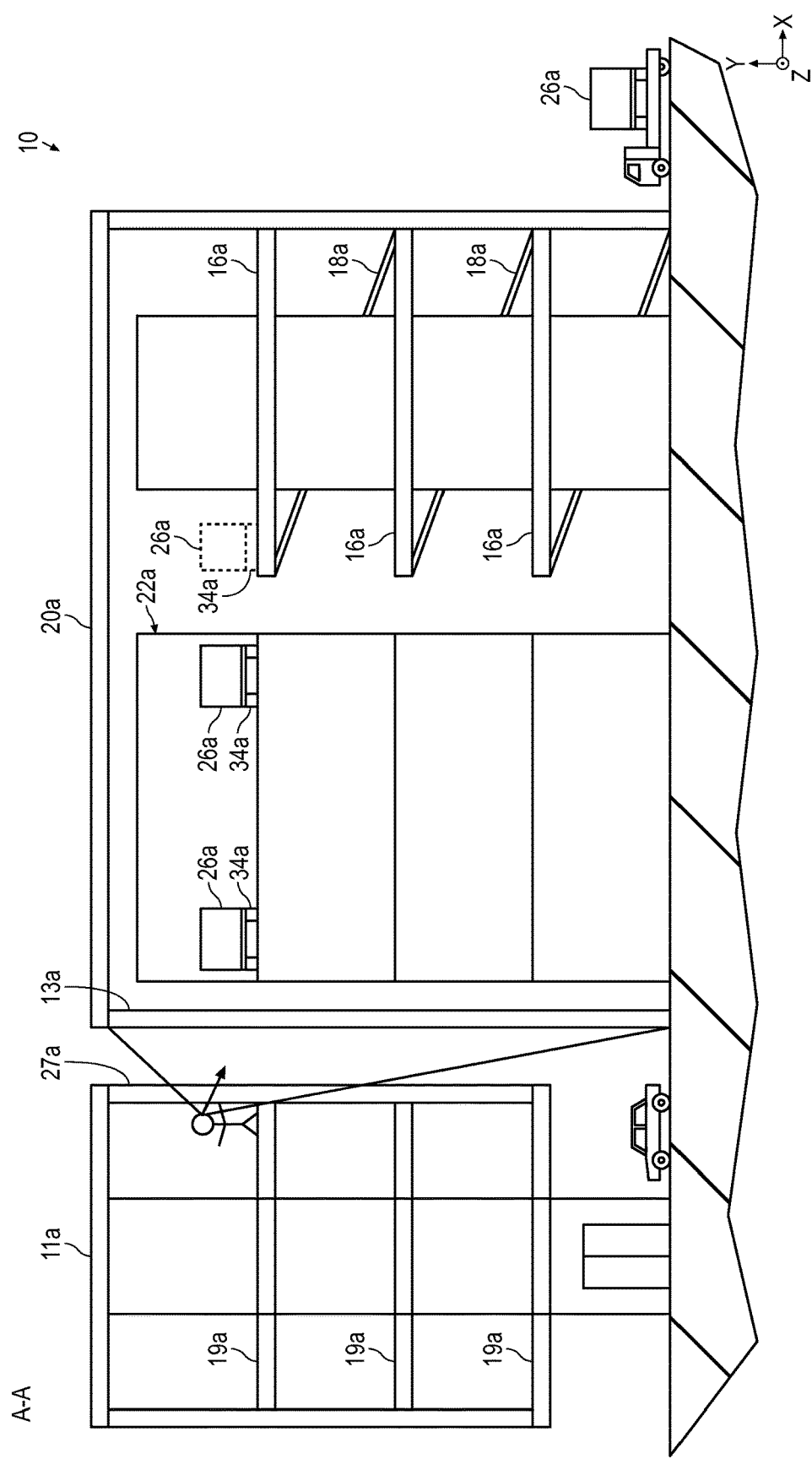
Figure 8:
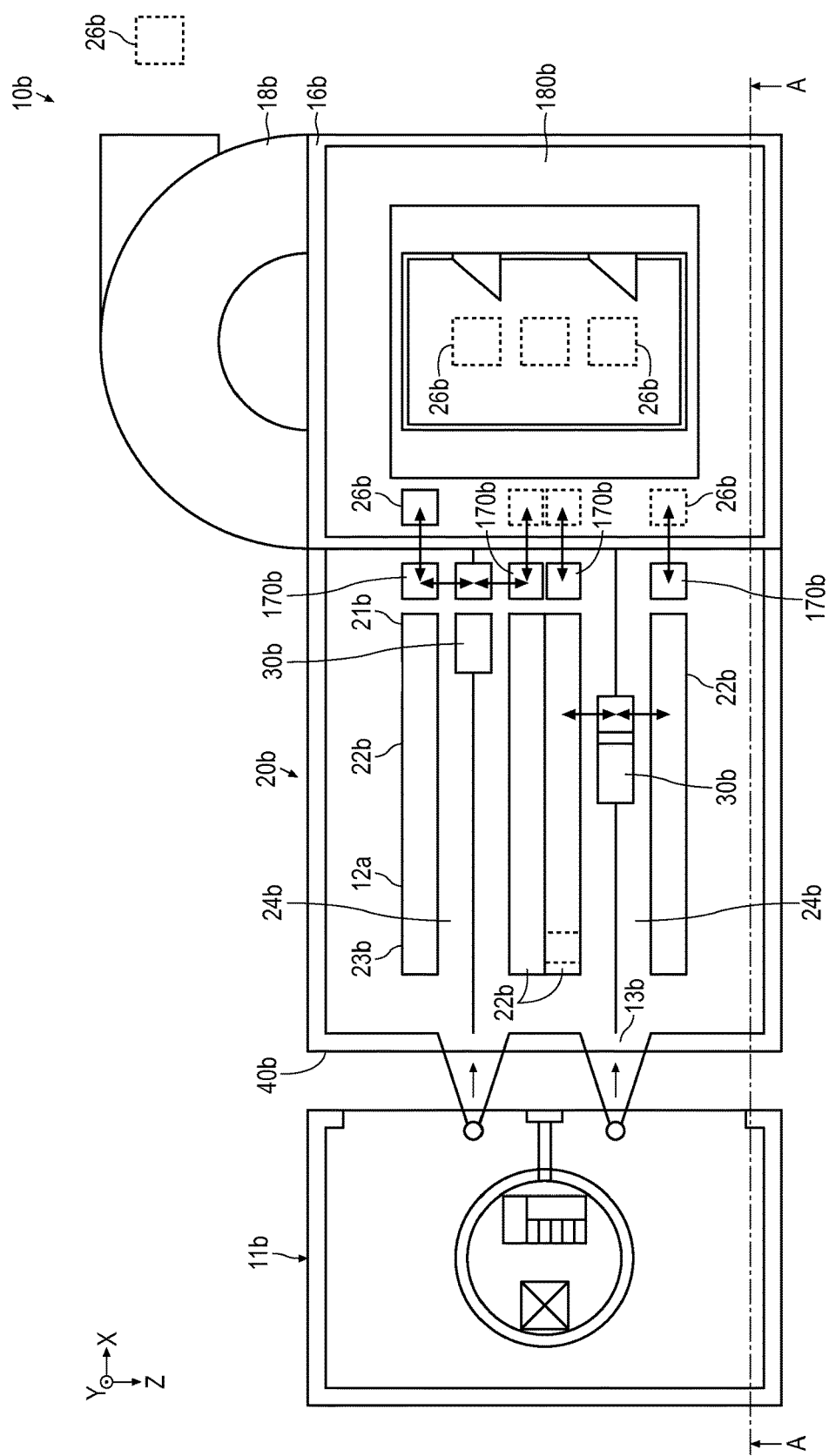
Figure 9:
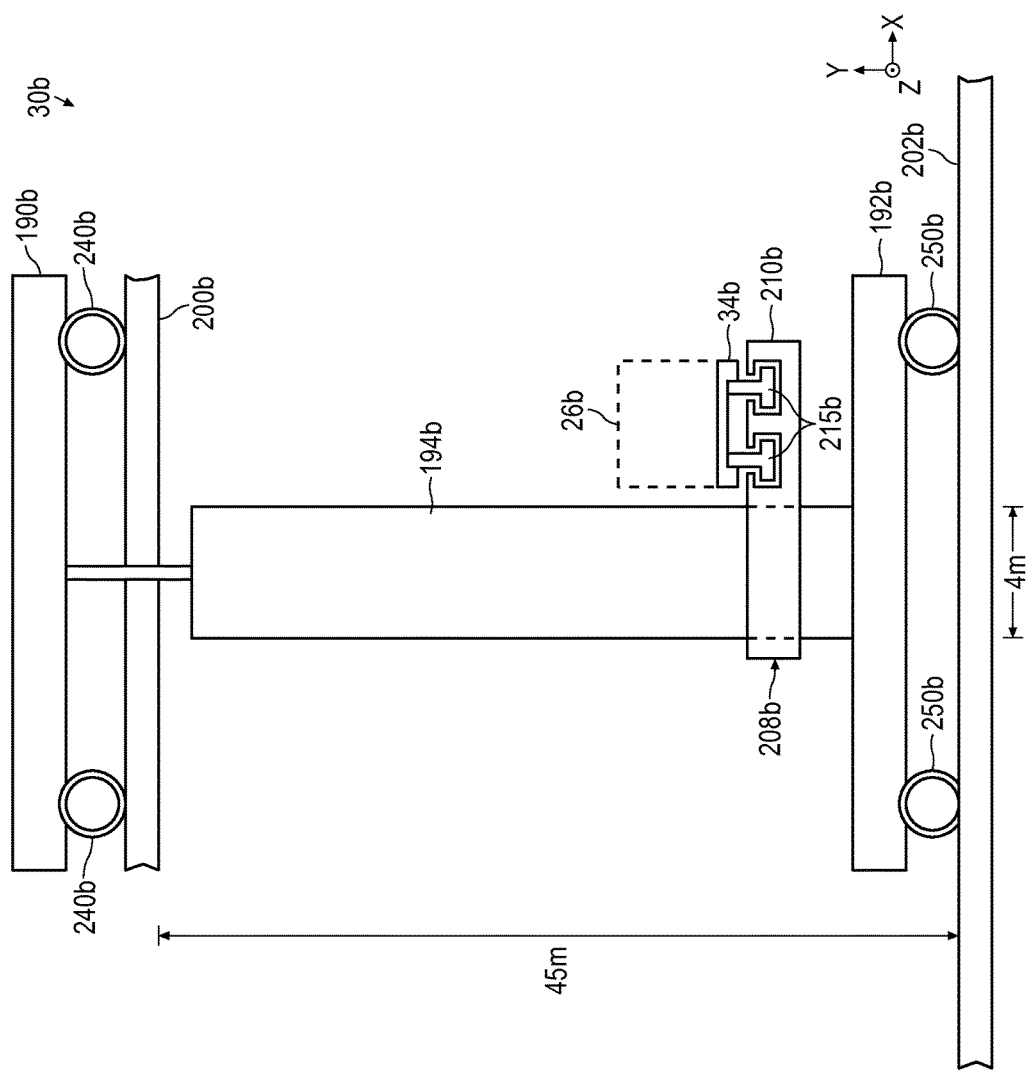
Figure 10:
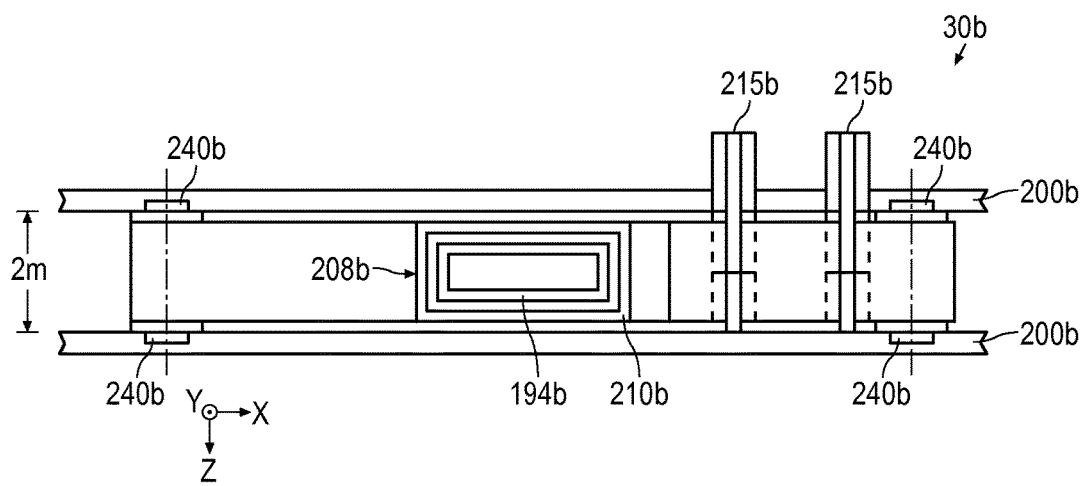
Figure 11:
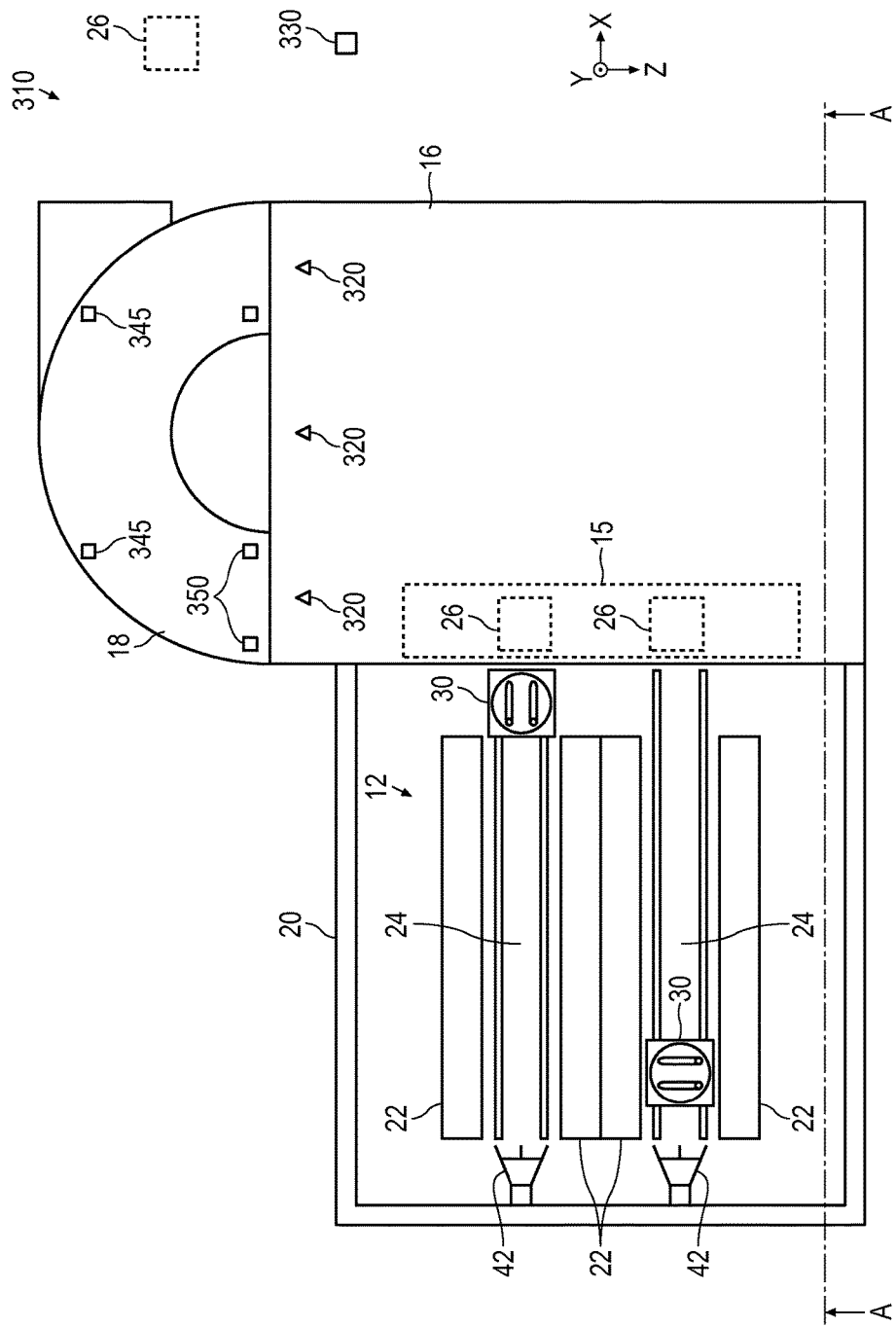
Figure 12:
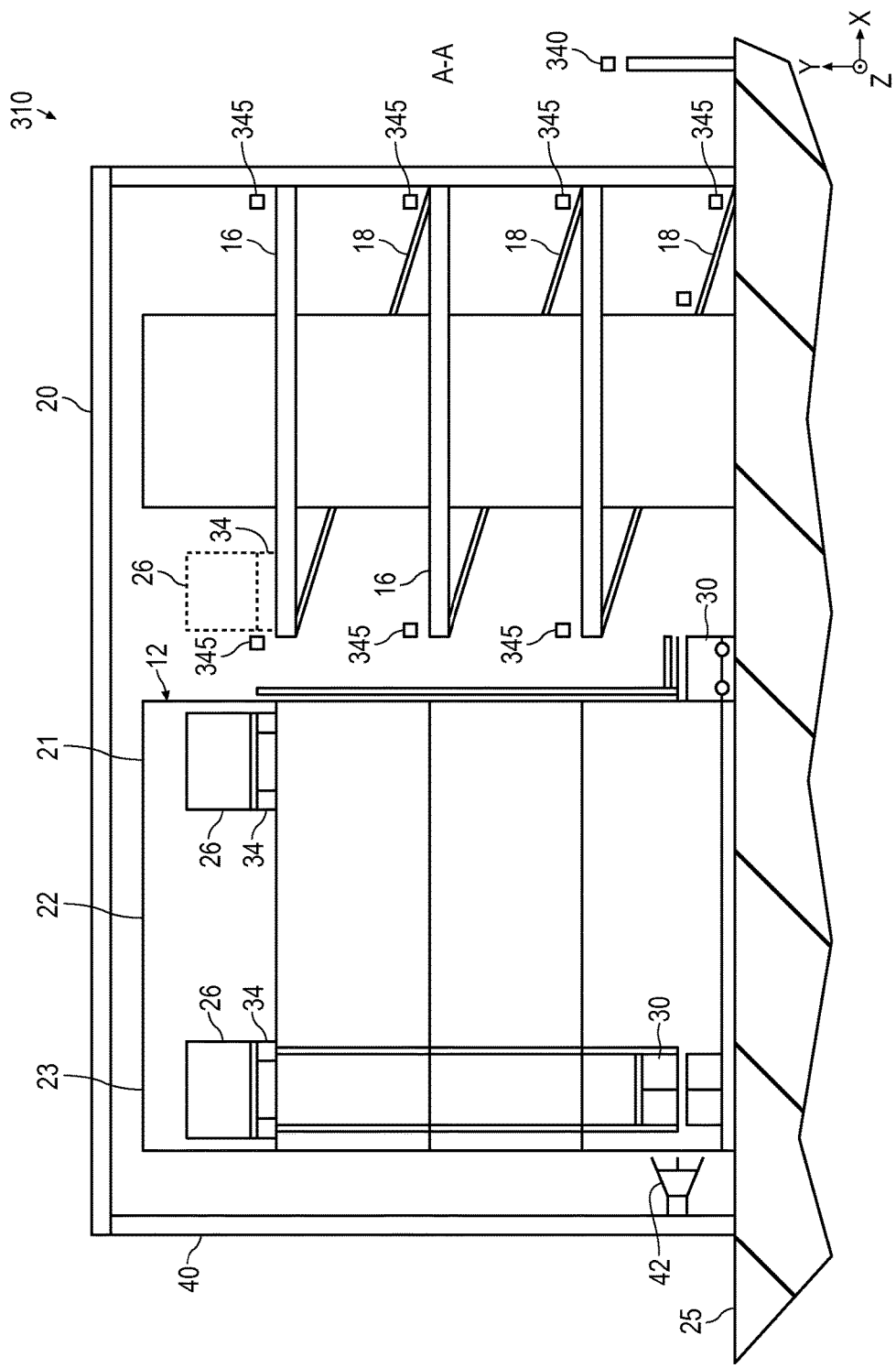
Figure 13:
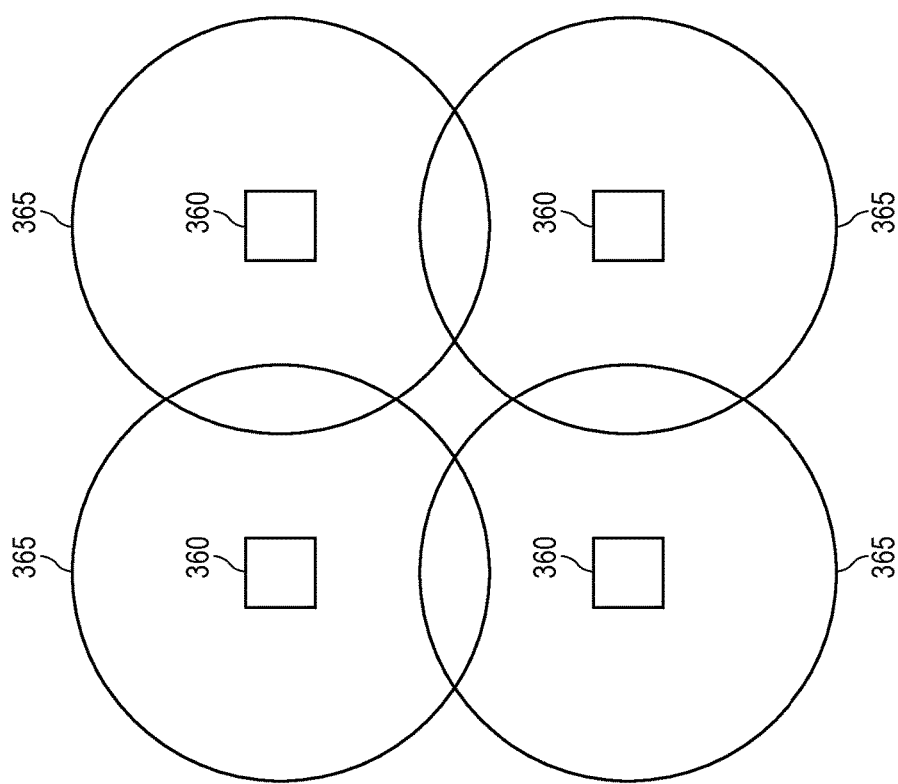

FIG. 1 illustrates a top view of a warehouse,

FIG. 2 illustrates a front sectional view of section A-A of the warehouse of FIG. 1, FIG. 3 illustrates a perspective view of the warehouse of FIG. 1, FIG. 4 illustrates a front view of a pallet load transfer vehicle of the warehouse of FIG. 1, FIG. 5 illustrates a side sectional view of section B-B of the transfer vehicle of FIG. 4, FIG. 6 illustrates a top view of a further warehouse, FIG. 7 illustrates a front sectional view of section A-A of the further warehouse of FIG. 6, FIG. 8 illustrates a top view of another warehouse, FIG. 9 illustrates a front view of a pallet load transfer vehicle of the warehouse of FIG. 8, FIG. 10 illustrates a top view of the pallet load transfer vehicle of FIG. 9, FIG. 11 illustrates a top view of another warehouse, FIG. 12 illustrates a front sectional view of section A-A of the warehouse of FIG. 11, and FIG. 13 illustrates an arrangement of RFID readers of the warehouse of FIG. 11.

In the following description, details are provided to describe embodiments of the application. It shall be apparent to one skilled in the art, however, that the embodiments may be practiced without such details.

Some parts of the embodiments have similar parts. The similar parts may have the same names or the similar part numbers with an alphabet symbol. The description of one similar part also applies by reference to another similar parts, where appropriate, thereby reducing repetition of text without limiting the disclosure.

FIG. 1 shows a warehouse 10. The warehouse 10 includes an automated storage and retrieval system (ASRS) 12. As better seen in FIG. 3, the ASRS 12 is placed next to a vertical stack of different floor levels 16. The floor levels 16 are connected to a set of vehicle ramps 18, as shown in FIGS. 1 and 2. The vehicle ramps 18 are connected to the ground level 25, as shown in FIG. 2. The ASRS 12 and the floor levels 16 are enclosed in a building 20.

Each floor level 16 has a work site that encloses a repacking bay 14 and also has a loading bay 15. The loading bay 15 includes pallet load pick and place locations. The pick and place locations are also called loading and unloading locations.

The ASRS 12 has one or more sets of storage shelf. Each set of storage shelf comprises two rows of multi-level pallet load storage shelves 22, which are separated by an aisle 24. Each pallet load storage shelf 22 extends essentially in a straight line while the two pallet load storage shelves 22 are placed essentially parallel to each other. A pallet load transfer vehicle 30 is provided for each aisle 24. The pallet load transfer vehicle 30 is placed in the area of the aisle 24. The pallet load storage shelves 22 stores loads 26, as illustrated in FIG. 2. The loads 26 refer to material, which can be placed on the vehicles for conveyance.

Each pallet load storage shelf 22 has several levels. Each level has a multitude of pallet load storage locations. One end 21 of the two rows of multi-level pallet load storage shelves 22 is positioned next to the vertical stack of work sites while another end 23 of the two rows is positioned next to a wall 40 of the warehouse building 20. An electronic surveillance device 42 is mounted inside the warehouse building 20 on the wall 40. The surveillance device 42 includes a camera and a monitor, wherein the camera points towards the first end 21 of the two rows of the pallet load storage shelves 22.

In use, the vehicle ramps 18 allow cargo vehicles for transporting loads 26 from a location, which is outside the warehouse 10 to the various floor levels 16 of the warehouse building 20. An example of the cargo vehicles is a lorry.

As shown in FIG. 2, the loads 26 are placed on pallets 34. The pallets 34 allow fork lift trucks to lift and transfer the loads 26, which are placed on the cargo vehicles, to a loading bay 15, which is located on the same floor level 16.

The pallets 34 refer to frames, which can be produced from wood or metal. The frames are used for supporting the loads 26. The loads 26 can be heavy. In one implementation, the metal frames are used for supporting maximum weight of about 1500 kilograms. Each fork lift truck has a pair of forks or arms for inserting into the pallets 34, which are placed below the loads 26. The forks then lift the pallets 34 and also move the pallets 34 to another area.

Before placing the loads 26 at the loading bay 15, the loads 26 can be placed in the repacking bay 14 on the same floor level for removing items from the loads 26, for adding items to the loads 26, or for removing certain items while adding other items to the loads 26.

The pallet load transfer vehicle 30 has fork members. The fork members can lift and move pallet loads, which can be heavy. Because of this, the pallet load transfer vehicle 30 is configured such that it is stable even when carrying high pallet loads.

The pallet load transfer vehicle 30 moves in a first horizontal axis along the aisle in while its fork members move vertically and also in a second horizontal axis which is essentially perpendicular to the first horizontal axis. The first horizontal axis depicted as the x-axis while the second horizontal axis is depicted as the z-axis in the figures. The vertical axis is depicted as the y-axis in the figures. The fork members serve to transport the loads 26 from the respective loading bays 15 at the various floor levels 16 to the respective different locations in the multiple levels of the pallet load storage shelves 22. Similarly, these fork members also serve to transport the loads 26 from the different locations in the multiple levels of the pallet load storage shelves 22 to the respective loading bays 15 at the various floor levels 16.

The multi-level repacking bays provide compact repacking areas, which saves land area, since the repacking bays are stacked vertically. The ASRS 12 also have an advantage of picking and placing the loads from the same place on each floor, which simplifies implementation.

FIGS. 4 and 5 shows the pallet load transfer vehicle 30, which comprises three principal components, namely, a carriage 31, a turntable 32 that is mounted on the carriage 31, and a pallet load pick/place unit 33 that is carried by the turntable 32.

Referring to the carriage 31, it comprises a frame, which is not illustrated in the figures. At each corner of the carriage frame is journaled a flanged wheel 38 which rides upon one of two fixed horizontal rails 29 that is mounted on the floor 28 of the warehouse building 20. The rails 29 here are placed in the aisle 24 of the ASRS 12 in the longitudinal axis of the aisle 24. The rails 29 extend in the x-axis, as shown in FIG. 4.

The frame includes a pair of spaced apart side bars joined at their corresponding ends to end bars. The frame also includes intermediate cross bars that span the end bars and includes diagonal braces extending between the side bars and the cross bars.

At one end of the carriage 31 is a hydraulic device, which is not illustrated in the figures. The hydraulic device includes a pair of reversible hydraulic motors, each of which is drivingly connected by gear wheels to the axle of the associated wheel 38. The hydraulic device also includes an electric motor, which is coupled to a hydraulic pump that is capable of pumping hydraulic fluid from a reservoir to the hydraulic motors through suitable conduits and valves. The carriage 31 also supports a control console that is connected to the hydraulic device.

Referring to the turntable 32, it comprises a lower rotatable platform 53 and an upper rotatable platform 153, which is placed vertically above the lower platform 53. A pair of upright beams 92 is placed between the lower platform 53 and the upper platform 153. In particular, the upper surface of the lower platform 53 is fixed to the lower end of upright beams 92 while the lower surface of the upper platform 153 is fixed to the upper end of upright beams 92.

The lower platform 53 rests upon a plurality of rollers 52 mounted on the top surface of the carriage 31, wherein the rollers 52 are arranged in the same horizontal plane. A central portion of the platform 53 includes a spindle 56 that is journaled in an opening on the top surface of the carriage 31.

The upper platform 153 is rotatably connected to a lower end of a spindle 156 while an upper end of the spindle 156 is fixed to the lower surface of a horizontally movable beam 90. The movable beam 90 is attached to flanged wheels 138, which rests on fixed horizontal rails 129. The rails 129 extend in the x-axis, as shown in FIG. 4.

The platforms 53 and 153 are attached to a rotating device, which is not illustrated in the figures. The rotating device comprises a hydraulic motor mounted on the carriage 31, wherein the hydraulic motor is supplied with fluid from the reservoir via suitable conduits and valve. The hydraulic motor drives a sprocket wheel around which is trained a chain having its opposite ends fixed to the turntable 32. Suitable chain tensioners also are carried by the carriage 31 to maintain the chain taut. Rotation of the motor in either of two opposite directions will cause corresponding rotation of the platforms 53 and 153.

Rotation of the platforms 53 and 153 is limited to about 180 degrees in each direction by means of a stop and an abutment mechanism.

Referring to the pick/place unit 33, it comprises a frame having a pair of horizontally extending frame members 100, which is slidably connected to the upright beams 92. The beams 92 extend in the z-axis, as shown in FIG. 4. The frame members 100 are connected to a hydraulic cylinder and piston mechanism, which is not shown in the figures.

The frame members 100 are inserted in a pair of sleeves 102 that is movable essentially in the one horizontal axis. The sleeves 102 are connected by a connecting plate 104. The connecting plate 104 is connected to a motor, which is not shown in the figures. A pair of pallet lifting arms or fork members 101 is fixed to the connected plate. The fork members 101 are connected to a motor, which is not shown in the figures.

In use, the actuated fork members 101 act to lift a pallet of a load and also to move the pallet with the load.

The sleeves 102 allow the fork members 101 to move in the longitudinal direction of the frame members 100, which is essentially in a horizontal direction. In particular, the sleeves 102 provide a projection position and a retracting position. In the projection position, the sleeves 102 with the fork members 101 move away from the upright beam 92 in the horizontal plane. In the retracting position, the sleeves 102 with the fork members 101 move towards the upright beam 92 in the horizontal plane.

The slidable connection between the frame members 100 and the upright beams 92 allow the frame members 100 with the fork members 101 to move vertically.

The actuated platforms 53 and 153 serve to rotate the frame members 100 with the fork members 101 about a vertical axis while the rollers 52 enable the platform 53 to perform this rotation. The rotatable platform 153 and the moveable beam 90 serve to keep the beams 92 vertical.

The actuated wheels 88 rotate in two opposite directions to move the carriage 31 and the pick/place unit 33, which includes the fork members 100, in the horizontal longitudinal axis of the rails 29. The rails 29 support the carriage 31 and the pick/place unit 33. The rails 29 also guide the carriage 31 and the pick/place unit 33 along the aisle 24 of the ASRS 12.

In short, the fork members 101 are movable linearly in two horizontal axe and one vertical axis, and movable rotatably about the vertical axis.

In a general sense, the storage shelves 22 can also store bins, reels, and cartons in addition to storing the pallet loads 26. The bins refer to containers for storing items. The cartons refer to boxes, which can be made of cardboard or plastic, for containing food or drinks. The reels refer to something that is turned around an object, which is often has a cylindrical shape. Similarly, the transfer device 30 can transport bins, reels, or cartons in addition to transporting the pallet loads 26.

FIGS. 6 and 7 show a further warehouse 10a. The further warehouse 10a includes an office building 11a and a warehouse building 20a.

The warehouse building 20a encloses an ASRS 12a and a vertical stack of multiple floor levels 16a. The floor levels 16a are linked to a set of vehicle ramps 18a, which is connected to the ground level of the warehouse building 20a.

One end 21a of the ASRS 12a is placed next to the stack of multiple floor levels 16a while another end 23a of the ASRS 12a is placed next to a wall 40a of the warehouse building 20a, wherein the wall 40a has elongated openings 13a. The ASRS 12a comprises several sets of storage shelves. Each set of storage shelves has two rows of multi-level pallet load storage shelves 22a, which are separated by an aisle 24a. A pallet load transfer device 30a is placed in the area of the aisle 24a.

The openings 13a extend along the width of the aisles 24a and also extend vertically. The openings 13a have transport sheets that allows light to pass through the openings 13a.

The office building 11a includes multiple floors 19a. Each office building floor 19a has transparent windows 27a that are facing the openings 13a of the warehouse building 20a.

In use, the pallet load transfer device 30a serves to transport pallet loads 26a between the multiple floor levels 16a and storage locations on the pallet load storage shelves 22a. The pallet loads 26a are supported by the pallet 34a.

The office building 11a houses workers at its different floors 19a, who can view the operation of the warehouse building 20a via the transparent windows 27a of the office building 11a and via the openings 13a of the warehouse building 20a. The workers can view almost the entire pallet load storage shelves 22a from its first end to its second end. From the viewing, the workers would know of stoppages of the transfer device 30a. The workers would also know quickly of problems, such as build-up of pallet loads 26a on the certain floor levels 16a. The workers would then be able to take appropriate actions, such as assignment of staff, to address the problem.

Put simply, the viewing has an advantage of providing a visual status of the operation of the warehouse building 20a, which allows the worker in the office building 11a take corresponding appropriate actions.

FIG. 8 shows another warehouse 10b. The warehouse 10b has an office building 11b and a warehouse building 20b.

The warehouse building 20b encloses an ASRS 12a and a vertical stack of multiple floor levels 16b. The floor levels 16b are linked to a set of vehicle ramps 18b, which is connected to the ground level of the warehouse building 20b.

One end 21b of the ASRS 12b is placed next to the stack of multiple floor levels 16b while another end 23b of the ASRS 12b is placed next to a wall 40b of the warehouse building 20b, wherein the wall 40b has elongated openings 13b. The ASRS 12b comprises several sets of storage shelves. Each set of storage shelves has two rows of multi-level pallet load storage shelves 22b, which are separated by an aisle 24b. A pallet load transfer device 30b is placed in the area of the aisle 24b.

Several essentially horizontal conveyor tracks 170b are placed between each end 21b of the ASRS 12b and the floor levels 16b. The conveyor tracks 170b are aligned vertically and are spaced vertically apart. Each conveyor track 170b is aligned with the corresponding floor level 16. A closed conveyor track 180b is also placed on each floor level 16. The conveyor tracks 170b and the conveyor track 180b comprise rollers.

In use, the pallet load transfer device 30b serves to transport pallet loads 26b between the pallet load storage shelves 22b and the conveyor tracks 170b. The rollers of the conveyor tracks 170b and 180b can be driven in two opposite directions. The conveyor tracks 170b act to transport the pallet loads 26b to the closed conveyor track 180b. The conveyor tracks 170b also receive pallet loads 26b from the closed conveyor track 180b. The closed conveyor tracks 180b act to transport the pallet loads 26b from one part of the floor level 16b to another part of the floor level 16b.

FIGS. 9 and 10 show the pallet load transfer device 30b. The pallet load transfer device 30b includes an upper cart 190b and a lower cart 192b.

The upper cart 190b and the lower cart 192b are connected by a vertical mast 194b with a pallet load pick/place unit 208b. Wheels 240b of the upper cart 190b rests on upper rails 200b while wheels 250b of the lower cart 192b rests on lower rails 202b.

The pick/place unit 208b include a mast sleeve module 210b with two horizontally moveable fork arm units 215b. The vertical mast 194b is inserted in the mast sleeve module 210b.

In use, the wheels 240b and 250b moves along the rails 200b and 202b respectively. The wheels 240b and 250b also move the carts 190b and 192b with the mast 194b and with the arm units 215b in the horizontal longitudinal direction of the rails 200b and 202b.

The mast sleeve module 210b with the arm units 215b moves vertically along the vertical mast 194b. The arm units 215b move horizontally in a direction that is at a right angle to the longitudinal direction of the rails 200b and 202b. The arm units 215b also serves to lift and move the pallet loads 26.

Different implementations of the embodiment are possible.

In one implementation, the shelves of the ASRS 12b can hold about 60,000 pallets. The building 20b has four floor levels 16b, wherein each floor level 16b supports a throughput of about 300 pallets. The building 20b also has 18 pallet load transfer devices 30b. Each pallet load transfer device 30b has a height of about 45 m (meters). The pallet load transfer device 30b has an upright elongated beam with a rectangular cross-section shape with a length of about 4 m and a width of about 2 m. The pallet load transfer device 30b is stable enough to transfer pallet loads with maximum weight of about 1,500 kilograms. As seen here, the pallet loads can be quite heavy.

In another implementation, the building 20b has five floor levels 16b, although other number of floor levels is also possible.

In summary, the above embodiments provide a warehouse building that has multiple floor levels and an ASRS. The multiple floor levels are linked with an arrangement of vehicle ramps. Each floor level has docking bays.

In use, the ramps allow vehicles from the ground level to reach the different floor levels.

The various floor levels are used for receiving loads or goods and for sending out loads. In a general sense, the floor levels serve as locations for production or as locations for logistic value adding. The docking bays are intended for accessing the loads directly and for loading and unloading of the loads.

The ASRS operates as a black box in which the black box can feed or transport its loads to the different floor levels. The loads include pallets with raw material or pallets with finished goods.

This warehouse building different from other warehouse building, which has an ASRS, wherein the ASRS serves as pallet storage. The other warehouse building also has a multi-storey conveyor line, wherein truck loading and unloading of loads is performed at only on one floor, usually the ground floor. The loads are then transported via vertical lifters or cargo lifts.

FIGS. 11 and 12 show another warehouse 310.

The warehouse 310 includes parts of the warehouse 10 of FIG. 1. The warehouse 310 includes an automated storage and retrieval system (ASRS) 12 that is placed next to a vertical stack of different floor levels 16. The floor levels 16 are connected to a set of vehicle ramps 18, which is connected to the ground level 25. The ASRS 12 and the floor levels 16 are enclosed in a building 20. Each floor level 16 has a loading bay 15. The loading bay 15 includes pallet load pick and place locations. The pick and place locations are also called loading and unloading locations.

In addition, the warehouse 310 comprises a plurality of Radio Frequency Identification (RFID) readers, a plurality of dock management camera sensors 320 and a management computer 330.

The RFID readers and the camera sensors 320 are communicatively connected to the management computer 330.

The RFID readers include building entrance RFID readers 340, vehicle ramp RFID readers 345, and floor level entrance RFID readers 350. In particular, the building entrance RFID readers 340 are placed in a vicinity of a vehicle entrance to the building 20. The vehicle ramp RFID readers 345 are placed at in a vicinity of the vehicle ramps 18. The floor level entrance RFID readers 350 are placed in a vicinity of entrances to the floor levels 16.

Referring to the dock management camera sensors 320, they are placed at the every floor levels 16 and they are pointed or directed toward cargo vehicle parking areas or movement areas of the floor levels 16.

In use, a guard at the vehicle entrance to the building 20 provides a driver of a cargo vehicle with a badge before the cargo vehicle enters the building 20. The badge includes an RFID tag that comprises a memory unit, which contains a unique identifier data.

The guard also sends a vehicle number of the cargo vehicle, driver data, and driver badge data to the computer 330.

The RFID readers act to interrogate the driver badge RFID tag by sending a predetermined electromagnetic wave signal to the RFID tag.

The driver badge RFID tag responds to the interrogation by sending an electromagnetic wave signal that carries the RFID identifier data to the RFID reader.

The RFID readers sent the received RFID identifier data to the computer 330.

In detail, the building entrance RFID readers 340 detect a presence of the driver badge RFID tag at the vehicle entrance to the building 20.

The vehicle ramp RFID readers 345 detect a presence of the driver badge RFID tag at respective locations of the vehicle ramps 18.

The floor level entrance RFID readers 350 detect a presence of the driver badge RFID tag at the respective entrances to the floor levels 16.

Referring to the camera sensors 320, they read license plates of the cargo vehicles and detect people movement. The camera sensors then sends the read data and the detected data to the computer 330.

In a general sense, the RFID readers can also be placed at the work areas, such as a packing or repacking bay, of the floor levels 16.

The pallets can also have RFID tags for identifying the pallets.

FIG. 13 shows a possible arrangement of RFID readers 360 of the warehouse 310. The RFID readers 360 have operating ranges 365 that overlap with operating ranges 365 of adjacent RFID readers 360 for determining a location of a RFID tag.

The embodiments can also be described with the following lists of features or elements being organized into an item list. The respective combinations of features, which are disclosed in the item list, are regarded as independent subject matter, respectively, that can also be combined with other features of the application.

1. A multi-storey warehouse comprising
   a warehouse building,
   a plurality of floor levels within the warehouse building,
   an inclined ramp arrangement connecting the floor levels with a ground level, the ramp arrangement being adapted to be used by a vehicle,
   at least one automated storage and retrieval system within the warehouse building, the automated storage and retrieval system comprising two adjacent rows of multi-storey pallet racks which are separated by an aisle, the pallet racks and the aisle essentially being arranged along a straight line, wherein a first end of the automated storage and retrieval system is provided adjacent to a side of the floor levels, and
   at least one handling device, the handling device being located in the area of the aisle, the handling device comprising a floor rail supporting a lower cart and a top rail above the multi-storey pallet racks supporting an upper cart, at least one vertical beam extending between the upper cart and the lower cart, and a pallet load pick/place unit, wherein the handling device serves a plurality of pick/place locations which are provided at the floor levels as well as a plurality of storage locations which are provided in the multi-storey pallet racks.

2. The multi-storey warehouse according to item 1, wherein the pick/place locations are aligned essentially vertically.

3. The multi-storey warehouse according to item 1 or 2, wherein
   the plurality of floor levels comprises a plurality of work-site enclosures.

4. The multi-storey warehouse according to one of the above-mentioned items, wherein
   a second end of the automated storage and retrieval system is positioned adjacent to a side of the warehouse building, wherein the side of the warehouse building comprises at least one vertical opening, the vertical opening extends essentially along the width of the aisle.

5. The multi-storey warehouse according to one of the above-mentioned items, wherein
   the vertical opening comprises a transparent weather cover.

6. The multi-storey warehouse according to one of the above-mentioned items, wherein
   an office building is provided in the vicinity of the side of the warehouse building, wherein the office building comprises rooms with windows that are facing the side of the warehouse building.

7. The multi-storey warehouse according to one of the above-mentioned items, wherein
   a second end of the automated storage and retrieval system comprises at least one electronic surveillance system, the electronic surveillance system comprising a camera being directed towards the first end of the automated storage and retrieval system.

8. The multi-storey warehouse according to one of the above-mentioned items further comprising a plurality of Radio Frequency Identification (RFID) readers for reading a RFID tag of a cargo vehicle.

9. A method for delivering a pallet load to a storage location within a multi-storey warehouse, the storage location being provided in two adjacent rows of multi-storey pallet racks which are separated by an aisle, the method comprising
providing the pallet load to a shipping location,
using a vehicle for transporting the pallet load from the shipping location to one of a plurality of floor levels of the multi-storey warehouse, and to a pick/place location which is provided at the same floor level, and
using a handling device for transporting the pallet load from the pick/place location to the storage location.

10. A method for handling a pallet load for a storage location within a multi-storey warehouse, the storage location being provided within two adjacent rows of multi-storey pallet racks which are separated by an aisle, the method comprising
storing the pallet load to the storage location, the storing comprising
providing the pallet load to a shipping location,
using a vehicle for transporting the pallet load from the shipping location to one of a plurality of floor levels of the multi-storey warehouse and to a pick/place location which is provided at the same floor level, and
using a handling device being located in the area of the aisle for transporting the pallet load from the pick/place location to the storage location, and
retrieving the pallet load from the storage location, the retrieving comprising
using the handling device for transporting the pallet load from the storage location to a pick/place location which is provided at one of the plurality of the floor levels, and
using the vehicle for transporting the pallet load from the pick/place location to a shipping location.

11. The method according to item 10, wherein
the retrieving of the pallet load further comprises
using the vehicle for transporting the pallet load from the pick/place location to a repacking location on the same floor level, and
repacking the pallet load.

12. The method according to item 11, wherein
the repacking of the pallet load comprises removing items from the pallet load.

13. The method according to item 11 or 12, wherein
the repacking of the pallet load comprises adding items to the pallet load.

14. The method according to item 9 or 10, wherein
a first vehicle is used for transporting the pallet load from the shipping location to one of the plurality of floor levels of the multi-storey warehouse, and a second vehicle is used for transporting the pallet load from the first vehicle to the pick/place location at the same floor level.

15. A method to manage a warehouse according to one of items 1 to 7, comprising
allocating a plurality of storage locations to a customer,
allocating at least one work site enclosure to the customer, and
handling of pallet loads between the plurality of storage locations and the at least one work site enclosure.

16. The method according to item 15, wherein
the number of storage locations which are allocated to the customer is altered according to a storage location request message of the customer.

17. The method according to item 15 or 16, wherein
the number of work site enclosures which are allocated to the customer is altered according to a work site enclosure request message of the customer.

18. A method to manage a warehouse according to one of items 1 to 7, comprising
obtaining visual information of a handling of pallet loads,
selecting a predetermined message that corresponds to the visual information, and
sending the predetermined message to an operator of the warehouse building.

19. The method according to item 18, wherein
the obtaining of the visual information is provided from outside of the warehouse building through a vertical opening of a side a warehouse building.

20. The method according to item 18 or 19, wherein
the obtaining of the visual information is provided by an electronic surveillance system with a camera that is directed towards the automated storage and retrieval system.

Although the above description contains much specificity, this should not be construed as limiting the scope of the embodiments but merely providing illustration of the foreseeable embodiments. The above stated advantages of the embodiments should not be construed especially as limiting the scope of the embodiments but merely to explain possible achievements if the described embodiments are put into practice. Thus, the scope of the embodiments should be determined by the claims and their equivalents, rather than by the examples given.

REFERENCE NUMBERS 10 warehouse
12 automated storage and retrieval system
14 repacking bay
15 loading bay
16 floor level
18 vehicle ramp
20 building
21 end
22 multi-level pallet load storage shelf
23 end
24 aisle
25 ground level
26 pallet load
28 floor
29 rail
30 pallet load transfer device
31 carriage
32 turntable
33 pick/place unit
34 pallet
38 flanged wheel
40 wall
42 electronic surveillance device
52 roller
53 rotatable platform
56 spindle
90 movable beam
92 upright beam
100 frame member
101 fork member 102 sleeve
104 connecting plate
129 rail
138 flanged wheel
153 rotatable platform
156 spindle
310 warehouse
320 dock management camera sensor
330 management computer
340 building entrance RFID reader
345 vehicle ramp RFID reader
350 floor level entrance RFID reader
360 RFID reader
365 operating range
10a warehouse
11a office building
12a ASRS
13a opening
16a floor level
18a vehicle ramp
19a floor
20a warehouse building
21a end
22a multi-level pallet load storage shelf
23a end
24a aisle
26a pallet load
27a window
30a pallet load transfer device
34a pallet
40a wall
10b warehouse
11b office building
12a ASRS
13b opening
16b floor level
18b vehicle ramp
20b warehouse building
21b end
22b multi-level pallet load storage shelf
23b end
24b aisle
30b pallet load transfer device
40b wall
190b upper cart
192b lower cart
194b mast
200b upper rail
202b lower rail
208b pick/place unit
210b mast sleeve module
215b moveable fork arm unit
240b wheel
250b wheel

The invention claimed is:

1. A multi-storey warehouse comprising:
a warehouse building,
a plurality of floor levels within the warehouse building,
an inclined ramp arrangement connecting the floor levels with a ground level, the ramp arrangement being adapted to be used by a ramp vehicle,
at least one automated storage and retrieval system within the warehouse building, the automated storage and retrieval system comprising two adjacent rows of multi-storey pallet racks which are separated by an aisle, the pallet racks and the aisle essentially being arranged along a straight line, wherein a first end of the automated storage and retrieval system is provided adjacent to a side of the floor levels, and
at least one handling device, the handling device being located in the area of the aisle; the handling device comprising a floor rail supporting a lower cart, a top rail above the multi-storey pallet racks supporting an upper cart, and an aisle vehicle;
the aisle vehicle comprising:
the lower cart,
the upper cart,
an upper platform rotatably connected to the upper cart, the upper platform configured to rotate about a vertical axis,
a lower platform rotatably connected to the lower cart, the lower platform configured to rotate about the vertical axis,
at least one vertical beam extending between the upper cart and the lower cart, and
a pallet load pick/place unit;
wherein the handling device serves the multi-storey pallet racks.

2. The multi-storey warehouse according to claim 1, wherein each of the plurality of floor levels comprises a repacking bay that is separate from the at least one automated storage and retrieval system and is configured to allow a load going to the at least one automated storage and retrieval system or coming from the at least one automated storage and retrieval system to be modified by one of removal of items from the load and addition of items to the load.

3. The multi-storey warehouse according to claim 1, wherein a second end of the automated storage and retrieval system is positioned adjacent to a side of the warehouse building, wherein the side of the warehouse building comprises at least one vertical opening, the vertical opening extending essentially along the width of the aisle.

4. The multi-storey warehouse according to claim 1, wherein the vertical opening comprises a transparent weather cover.

5. The multi-storey warehouse according to claim 1, wherein an office building is provided in the vicinity of the side of the warehouse building, wherein the office building comprises rooms with windows that are facing the side of the warehouse building.

6. The multi-storey warehouse according to claim 1, wherein a second end of the automated storage and retrieval system comprises at least one electronic surveillance system, the electronic surveillance system comprising a camera being directed towards the first end of the automated storage and retrieval system.

7. The multi-storey warehouse according to claim 1 further comprising a plurality of Radio Frequency Identification (RFID) readers for reading an RFID tag of a cargo vehicle.

8. The multi-storey warehouse according to claim 7, wherein the plurality of RFID readers have overlapping operating ranges.

9. The multi-storey warehouse according to claim 1, wherein the upper cart is positioned above the top rail, the upper cart comprising a plurality of wheels rotatable about a substantially horizontal axis, the wheels configured to rest on an upward facing surface of the top rail.

10. The multi-storey warehouse according to claim 9, wherein the pallet load pick/place unit comprises a fork member for lifting a pallet load.

11. A multi-storey warehouse comprising:
a warehouse building,
a plurality of floor levels within the warehouse building,
an inclined ramp arrangement connecting the floor levels with a ground level, the ramp arrangement being adapted to be used by a ramp vehicle,
at least one automated storage and retrieval system within the warehouse building, the automated storage and retrieval system comprising two adjacent rows of multi-storey pallet racks which are separated by an aisle, the pallet racks and the aisle essentially being arranged along a straight line, wherein a first end of the automated storage and retrieval system is provided adjacent to a side of the floor levels, and
at least one handling device, the handling device being located in the area of the aisle; the handling device comprising a floor rail supporting a lower cart, a top rail supporting an upper cart, and an aisle vehicle; the aisle vehicle comprising:
the lower cart,
the upper cart,
an upper platform rotatably connected to the upper cart, the upper platform configured to rotate about a vertical axis,
a lower platform rotatably connected to the lower cart, the lower platform configured to rotate about the vertical axis,
at least one vertical beam extending between the upper platform and the lower platform, and
a pallet load pick/place unit comprising a fork member configured to lift a load supported by a one of the two adjacent rows of multi-storey pallet racks;
wherein the handling device serves the multi-storey pallet racks.

12. The multi-storey warehouse according to claim 11, wherein a second end of the automated storage and retrieval system is positioned adjacent to a side of the warehouse building, wherein the side of the warehouse building comprises at least one vertical opening, the vertical opening extending essentially along the width of the aisle.

13. The multi-storey warehouse according to claim 12, wherein the vertical opening comprises a transparent weather cover.

14. The multi-storey warehouse according to claim 11, wherein a second end of the automated storage and retrieval system comprises at least one electronic surveillance system, the electronic surveillance system comprising a camera being directed towards the first end of the automated storage and retrieval system.

15. The multi-storey warehouse according to claim 11, further comprising a plurality of Radio Frequency Identification (RFID) readers for reading an RFID tag of a cargo vehicle.

16. A multi-storey warehouse comprising:
a warehouse building,
a plurality of floor levels within the warehouse building,
an inclined ramp arrangement connecting the floor levels with a ground level, the ramp arrangement being adapted to be used by a ramp vehicle,
at least one automated storage and retrieval system within the warehouse building, the automated storage and retrieval system comprising two adjacent rows of multi-storey pallet racks which are separated by an aisle, the pallet racks and the aisle essentially being arranged along a straight line, wherein a first end of the automated storage and retrieval system is provided adjacent to a side of the floor levels, and
at least one handling device, the handling device being located in the area of the aisle; the handling device comprising a floor rail supporting a lower cart, a top rail above the multi-storey pallet racks supporting an upper cart, and an aisle vehicle;
the aisle vehicle comprising:
the lower cart,
a plurality of rollers mounted on a top surface of the lower cart,
the upper cart,
an upper platform rotatably connected to the upper cart, the upper platform configured to rotate about a vertical axis,
a lower platform rotatably connected to the lower cart, the lower platform configured to rotate about the vertical axis and to rest upon the plurality of rollers,
at least one vertical beam extending between the upper platform and the lower platform, and
a pallet load pick/place unit;
wherein the handling device serves the multi-storey pallet racks.

17. The multi-storey warehouse according to claim 16, wherein a second end of the automated storage and retrieval system is positioned adjacent to a side of the warehouse building, wherein the side of the warehouse building comprises at least one vertical opening, the vertical opening extending essentially along the width of the aisle.

18. The multi-storey warehouse according to claim 17, wherein the vertical opening comprises a transparent weather cover.

19. The multi-storey warehouse according to claim 16, wherein a second end of the automated storage and retrieval system comprises at least one electronic surveillance system, the electronic surveillance system comprising a camera being directed towards the first end of the automated storage and retrieval system.

20. The multi-storey warehouse according to claim 16, further comprising a plurality of Radio Frequency Identification (RFID) readers for reading an RFID tag of a cargo vehicle.

* * * * *